UNITED STATES PATENT OFFICE.

CHARLES ALDEN, OF NEWBURGH, NEW YORK.

IMPROVEMENT IN PREPARING TOMATOES AND OTHER FRUITS AND VEGETABLES TO BE USED AS FOOD.

Specification forming part of Letters Patent No. 101,562, dated April 5, 1870.

*To all whom it may concern:*

Be it known that I, CHARLES ALDEN, of Newburgh, in the county of Orange and State New York, have invented a new and useful Improvement in Evaporating Tomatoes and other Fruits; and I do hereby declare the following to be a full, clear, and exact description thereof, which will enable those skilled in the art to make and use the same.

This invention consists in subjecting tomatoes and other fruit to an evaporating process by exposing such tomatoes or other fruit first to a low temperature while they are surrounded with artificial currents of pure rarefied air passing through and around the same, whereby the fruit is expanded and the moisture from the innermost parts is brought to the surface and instantly absorbed and carried off by the passing air, the temperature and rarefication of the air being gradually increased until a sufficient amount of water is evaporated to prevent fermentation. A large percentage of gluten and starch is thereby changed into sugar, while the tomatoes or other fruit retain all their natural color, taste, and flavor. With the proper apparatus this process is so rapid that over eighty per cent. of water can be removed from seven bushels of fruit every hour, and that no fermentation can take place, all the saccharine matter in the fruit being held intact in a concentrated form, producing an article entirely different from the ordinary dried or desiccated fruit.

The fruits, after having been exposed to the evaporating process, are compressed into cakes or junks of any desirable form or shape, and preserved for a long time, and packed in a comparatively small space; and when the evaporated fruits are soaked in water they rapidly assume their original taste and flavor.

This invention is applicable to fruits of all kinds, but it is particularly intended for preserving tomatoes, which heretofore have only been preserved in cans.

What I claim as new, and desire to secure by Letters Patent, is—

1. A junk or cake of tomatoes or other fruits formed by exposing such fruits to an artificial current or currents of air, and then compressing them into the required form or shape, as set forth.

2. The herein-described process of treating tomatoes or other fruits by exposing them to an evaporating process in an artificial current of air, and afterward compressing the same into junks or cakes, substantially as specified.

CHARLES ALDEN.

Witnesses:
W. HAUFF,
C. WAHLERS.